UNITED STATES PATENT OFFICE.

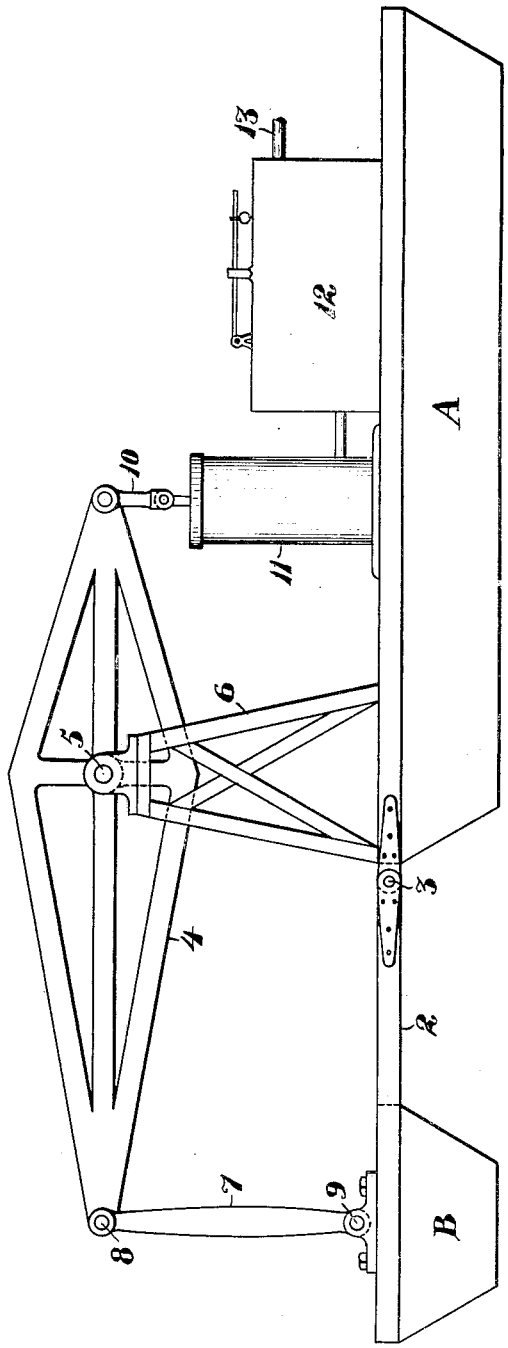

CHARLES E. NEWELL, OF SAN FRANCISCO, CALIFORNIA, ASSIGNOR OF ONE-HALF TO WILLIAM L. VON, OF SAN FRANCISCO, CALIFORNIA.

WAVE-MOTOR.

No. 816,934.     Specification of Letters Patent.     Patented April 3, 1906.

Application filed June 19, 1905. Serial No. 265,926.

*To all whom it may concern:*

Be it known that I, CHARLES E. NEWELL, a citizen of the United States, residing in the city and county of San Francisco and State of California, have invented new and useful Improvements in Wave-Motors, of which the following is a specification.

My invention relates to an apparatus designed to utilize the movement of waves or swell and apply the same to the operation of machinery.

It consists in a combination of mechanism and in details of construction which will be more fully explained by reference to the accompanying drawing, in which the figure illustrates my invention.

It is the object of my invention to provide an apparatus which may be located at any point where the action of the waves or a swell can be utilized and without reference to its distance from the shore and comprises an anchored base-float of such weight and size as to have comparatively little motion and a lighter and movable float hinged thereto and at such a distance therefrom as to have independent movements and in the connection of the movable float with one end of a walking-beam mounted upon the main float, the other end of the walking-beam having such connections as may be found desirable.

As shown in the drawing, A represents a float of considerable size and so ballasted or weighted that ordinary or small waves will have little or no effect upon it. This float will in practice be securely anchored at such point as may be desired. B represents a smaller and lighter float which is susceptible of movement by any waves or swell that may occur. This float is connected by beams, as at 2, with the main float, to which it is hinged, as shown at 3. The float B represents one of as many as it may be found desirable to use, and these floats may be hinged and connected to the main float upon any or all sides, if found desirable.

4 is a walking-beam having journals, as at 5, which are mounted to oscillate in suitable boxes upon a stout frame 6, which is secured to the float A. The long arm of this walking-beam extends sufficiently outward from the float A to substantially equal the length of the connecting-arms 2, and it is connected by a pitman 7 with the float B. This pitman may have any suitable or usual connection with the end of the walking-beam, as at 8, and it has a pivotal connection 9 with a box or boxes which are firmly bolted to the float B, so that both up and down movements of this float will be communicated to the walking-beam, and the distance of the float B from the main float A will be maintained under all conditions. The movements of the float B will be thus communicated to the walking-beam 4, the other arm of which may be connected by a pitman, as at 10, with a plunger movable within a cylinder 11, fixed upon the float A.

The relative length of the walking-beam arms may be varied to suit conditions. With a long outward arm and a comparatively short inboard-arm there will be a considerable multiplication of power transmitted from the rising and falling float B, and this in turn may be utilized for such operations as it is desired to carry on on the main float.

In the present case I have shown the pump as connected with a receiver 12, and it may be so disposed as to pump water or air. For convenient use either upon the apparatus or at a distance therefrom I have found it desirable to compress air within the receiver 12, and this compressed air may be used to drive any suitable engine or machinery upon the float. Thus it may drive an engine and a dynamo to generate an electrical current which may be conducted away from the apparatus to a point where it can be utilized, or the air compressed within the receiver may be conducted away by flexible pipes to a distant point, where the engine or other machinery may be located. Such a conducting-pipe is shown at 13.

I have shown no special mechanism to be operated by the compressed air; but it will be obvious that a reciprocating or other engine capable of such operation may be employed.

By making a large heavily-ballasted float having little or no motion and the smaller float or floats maintained at a considerable distance from the main float it will be seen that any action of the waves or swell will affect the smaller floats in a greater degree than the main float, and in addition to this the distance at which the smaller floats are maintained away from the main float will insure the wave first acting upon these floats producing a maximum motion and afterward reaching the main float. Such motion as may be given the main float will be to a great extent in opposition to that of the smaller float and will therefore serve to increase the relative movement of the two.

Having thus described my invention, what I claim, and desire to secure by Letters Patent, is—

1. In an apparatus of the character described, a main float, a supplemental smaller and lighter float, arms to the outer ends of which said float is fixed, said arms being loosely hinged to the main float, a walking-beam supported from the main float and projecting outwardly therefrom, a pitman connecting the outboard end of the walking-beam with the smaller float, and connections between the inboard end of the walking-beam and mechanism actuated thereby.

2. In a wave-utilizing apparatus, an approximately stationary main float having a frame fixed thereon, a walking-beam supported upon said frame with the outboard end projecting beyond the main float, a smaller float located at a distance from the main float, a pitman connecting the outboard end of the walking-beam with said smaller float, and distance-rods connecting the smaller float with the main float and mechanism actuated by the movement of the inner end of the walking-beam.

3. The combination in a wave-motor of a large main, heavily-ballasted float, a smaller float located at a distance from the main float, hinged distance-rods by which the relative positions of the floats are maintained, a frame mounted upon the main float, a walking-beam supported and tiltable upon said frame having the longer arm extending outwardly, a pitman connecting said walking-beam arm with the smaller float and mechanism connected with the inner end of the walking-beam through which the motion of the smaller float is transmitted.

In testimony whereof I have hereunto set my hand in presence of two subscribing witnesses.

CHARLES E. NEWELL.

Witnesses:
S. H. NOURSE,
F. C. FLIEDNER.